US005542400A

United States Patent [19]

Matsumoto et al.

[11] Patent Number: 5,542,400

[45] Date of Patent: Aug. 6, 1996

[54] APPARATUS AND METHOD FOR DETERMINING A FAILURE OF AN EGR APPARATUS

[75] Inventors: Takuya Matsumoto; Toru Hashimoto; Mitsuhiro Miyake; Hitoshi Kamura, all of Kyoto, Japan; Yasuhisa Yoshida, Newport Beach, Calif.

[73] Assignee: Mitsubishi Jidosha Kogyo Kabushiki Kaisha, Tokyo, Japan

[21] Appl. No.: 490,010

[22] Filed: Jun. 13, 1995

[30] Foreign Application Priority Data

Sep. 30, 1994 [JP] Japan .................................... 6-237426

[51] Int. Cl.[6] .......................... F02M 25/07; G01M 15/00

[52] U.S. Cl. ........................................... 123/571; 73/117.3

[58] Field of Search ....................... 123/571; 364/431.06, 364/431.12; 73/116, 117.3, 118.1, 118.2

[56] References Cited

U.S. PATENT DOCUMENTS

| | | | |
|---|---|---|---|
| 4,671,107 | 6/1987 | Chiesa et al. | 73/118.2 |
| 4,834,054 | 5/1989 | Hashimoto et al. | 123/571 |
| 5,137,004 | 8/1992 | Takahata et al. | 123/571 |
| 5,150,695 | 9/1992 | Kondo | 123/571 |
| 5,207,093 | 5/1993 | Maeda | 73/118.1 |
| 5,239,971 | 8/1993 | Uchinami | 123/571 |
| 5,243,852 | 9/1993 | Morita | 73/117.3 |
| 5,251,599 | 10/1993 | Ohuchi et al. | 123/571 |
| 5,331,560 | 7/1994 | Tamura | 364/431.12 |
| 5,341,300 | 8/1994 | Fujimoto | 123/571 |
| 5,349,936 | 9/1994 | Uchinami | 123/571 |
| 5,368,005 | 11/1994 | Kako | 123/571 |

*Primary Examiner*—Willis R. Wolfe

[57] ABSTRACT

An apparatus for determining a failure of an exhaust gas recirculation (EGR) apparatus includes an electronic control unit. When judging the fulfillment of the failure diagnosis executing condition, the electronic control unit stores the intake pressure detected by a pressure sensor, and then introduces part of the exhaust gas from an engine to an intake passage via an EGR passage to start the EGR for failure diagnosis. Thereafter, the intake pressure is detected again. If a significant change in intake pressure does not occur before and after the execution of the EGR for failure diagnosis, it is judged that the EGR apparatus is faulty. If the failure diagnosis executing condition becomes unfulfilled during the execution of failure diagnosis, the EGR for failure diagnosis is stopped, and the failure diagnosis entailing EGR is prohibited from the time when the EGR for failure diagnosis is stopped until a predetermined period of time has elapsed, by which the deterioration in riding quality and drivability of the vehicle is prevented.

20 Claims, 6 Drawing Sheets

APPARATUS AND METHOD FOR DETERMINING A FAILURE OF AN EGR APPARATUS

BACKGROUND OF THE INVENTION

1. Field of the Invention

The present invention relates to an apparatus and method for determining a failure of an EGR (exhaust gas recirculation) apparatus.

2. Description of the Related Art

The major ingredients of the exhaust gas discharged from a gasoline engine are carbon monoxide (CO), hydrocarbon (HC), and nitrogen oxides (NOx). Nitrogen oxides are produced by the chemical reaction between nitrogen and oxygen contained in an air-fuel mixture under a high-temperature condition which takes place when the air-fuel mixture supplied to an engine burns. The majority of nitrogen oxides contained in the exhaust gas is nitric monoxide (NO). Even with the same air-fuel ratio of the air-fuel mixture, if the quality of inactive ingredients contained in the air-fuel mixture increases, the combustion temperature of the air-fuel mixture lowers with consequent reduction in the nitric monoxide produced when the air-fuel mixture burns.

Based on the fact described above, an EGR apparatus designed to cause part of exhaust gas to be returned to an induction system of an engine to thereby add the exhaust gas to an air-fuel mixture as an inactive ingredient is used for exhaust gas purification.

An EGR apparatus generally has an EGR passage for connecting an exhaust passage of an engine to an intake passage, a negative-pressure operated EGR valve disposed in the EGR passage to regulate the amount of exhaust gas introduced to the intake system (EGR amount), an electromagnetic control valve for causing the EGR valve to open and close by controlling negative pressure supplied from the intake passage to the negative pressure chamber of the EGR valve, and an electronic control unit (ECU) for determining a target EGR amount and controlling the drive of the electromagnetic control valve so as to attain the target EGR amount.

In the EGR configured as described above, the EGR valve itself may malfunction due to the seizure of the valve body of EGR valve, breakage of the diaphragm of EGR valve, and the like. Sometimes, breakage of the wire connecting the ECU to the electromagnetic control valve or poor contact of the connector may occur. If such a failure occurs in the EGR apparatus, it becomes impossible for the EGR apparatus to control the EGR amount, resulting in loss of the exhaust gas purifying function of the EGR apparatus.

As a method for diagnosing a failure of an EGR apparatus, "METHOD FOR DIAGNOSING A FAILURE OF AN EXHAUST GAS CIRCULATION CONTROLLER" which performs a failure diagnosis when an engine is running in a decelerated operation zone is disclosed in Japanese provisional patent publication no. H2-9937. According to this diagnosis method, to perform the failure diagnosis, when an engine is in a stable condition following the completion of warm-up, the EGR valve is temporarily changed over from an open state to a closed state, by which the exhaust gas circulates from the exhaust passage to the intake passage via the EGR passage. Then, a difference between the intake pressure developed immediately before the EGR and that developed during the EGR is detected. If the difference is below a preset value, then it is judged that a failure of the EGR apparatus has occurred.

In this diagnosis method, when the failure diagnosis executing condition becomes fulfilled again after the failure diagnosis executing condition becomes unfulfilled and the execution of EGR is stopped due to the change in vehicle operation state during the failure diagnosis, EGR is restarted immediately. Therefore, when failure diagnosis is executed during the vehicle running in an operating environment, for example, in an urban area where the vehicle operating condition is liable to be changed, the start and stop of EGR are repeated frequently. In this case, the increase in intake pressure caused by the execution of EGR and the decrease in intake pressure caused by the stop of EGR are repeated frequently, so that the engine speed and the engine output torque fluctuate. Therefore, the riding quality and drivability of vehicle are impaired.

Further, when it is judged that an EGR is faulty, failure diagnosis is sometimes performed continuously to prevent mistaken diagnosis. In this case, the aforementioned trouble appears more remarkably due to the immediate restart of EGR effected when the failure diagnosis executing condition is fulfilled again.

SUMMARY OF THE INVENTION

An object of the present invention is to provide an apparatus and method for determining a failure of an exhaust gas recirculation (EGR) apparatus, which restrains the deterioration in riding quality and drivability caused by the execution of failure diagnosis.

According to one aspect of the present invention, there is provided an apparatus for determining a failure of an EGR apparatus having an EGR passage extending between the exhaust system and intake system of an internal combustion engine mounted on a vehicle, and an EGR valve, disposed in the EGR passage and arranged to be opened and closed, for controlling the amount of exhaust gas recirculating from the exhaust system to the intake system via the EGR passage. The determining apparatus is provided with failure determining means for executing failure diagnosis of at least one of the EGR valve and the EGR passage while opening/closing the EGR valve.

The failure determining apparatus comprises operation state detecting means for detecting the operation state of at least one of the vehicle and the internal combustion engine, and failure diagnosis prohibiting means for determining whether a predetermined failure diagnosis prohibiting condition is fulfilled on the basis of the operation state detected by the operation state detecting means, and for prohibiting the execution of the failure diagnosis executed by the failure determining means for a predetermined period of time from the time when the predetermined failure diagnosis prohibiting condition is fulfilled.

According to the above-described failure determining apparatus, when the failure diagnosis prohibiting condition becomes fulfilled before or during the failure diagnosis, the execution of failure diagnosis is prohibited for a predetermined period of time from the time when the failure diagnosis prohibiting condition is fulfilled. Therefore, even when the failure diagnosis executing condition becomes fulfilled for the first time or fulfilled again, the EGR for failure diagnosis is not immediately started or restarted. For this reason, even when a vehicle is running in a driving environment in which the failure diagnosis executing condition and the failure diagnosis prohibiting condition are fulfilled alternately, for example in an urban area in which the start and stop of vehicle are repeated frequently, the timing of start of failure diagnosis can be rationalized. Whereby, even when a vehicle is running in an urban area, the frequency of the execution and stop of EGR for failure diagnosis is lessened, so that the deterioration in riding quality and drivability caused by the fluctuation in engine speed and engine output torque can be prevented.

Preferably, the failure determining means includes intake state quantity detecting means for detecting at least one of the state quantity on the intake system side of said EGR valve in the EGR passage and the state quantity in the intake system, and comparing means for comparing the state quantity detected by the intake state quantity detecting means when the EGR valve is opened with the state quantity detected by the intake state quantity detecting means when the EGR valve is closed. The failure determining means executes the failure diagnosis in accordance with the result of this comparison.

If the EGR apparatus is normal, a significant change in state quantity occurs before and after the execution of EGR. If the EGR apparatus is faulty, such a significant change does .not occur. Therefore, according to the failure determining apparatus in accordance with the above preferred embodiment, the failure diagnosis of the EGR apparatus can be executed reliably.

More preferably, the intake state quantity detecting means detects, as the state quantity, the intake pressure or the intake air temperature in the intake system. In this case, the failure diagnosis of EGR apparatus can be executed at a relatively low cost and reliably.

Preferably, the operation state detecting means detects the temperature of the internal combustion engine, or determines whether the vehicle is stopping, or determines whether the internal combustion engine is in a decelerated operation state. The failure diagnosis prohibiting means judges that a predetermined failure diagnosis prohibiting condition is fulfilled when the internal combustion engine temperature is lower than a predetermined temperature, or when the vehicle is stopping, or when the internal combustion engine is not in a decelerated operation state. Alternatively, the operation state detecting means detects the rotational speed of the engine, and the failure prohibiting means determines whether the predetermined failure diagnosis prohibiting condition is fulfilled on the basis of the rotational speed of the internal combustion engine. In this case as well, the failure diagnosis of EGR apparatus can be executed at a relatively low cost and reliably.

According to another aspect of the present invention, there is provided a method for determining a failure of an EGR apparatus having an EGR passage extending between the exhaust system and intake system of an internal combustion engine mounted on a vehicle, and an EGR valve, disposed in the EGR passage and arranged to be opened and closed, for controlling the amount of exhaust gas recirculating from the exhaust system to the intake system via the EGR passage. In this method, failure diagnosis of at least one of the EGR valve and the EGR passage is executed while opening/closing the EGR valve.

The failure determining method comprises the steps of (a) detecting the operation state of at least one of the vehicle and the internal combustion engine, (b) determining whether a predetermined failure diagnosis prohibiting condition is fulfilled on the basis of the operation state detected in step (a), and (c) prohibiting the execution of the failure diagnosis for a predetermined period of time from the time when it is judged in step (b) that the predetermined failure diagnosis prohibiting condition is fulfilled.

According to the above-described failure determining method, when the failure diagnosis prohibiting condition becomes fulfilled, the execution of failure diagnosis is prohibited for a predetermined period of time from the time when the failure diagnosis prohibiting condition is fulfilled. Therefore, even when the vehicle is running in an operating environment in which the failure diagnosis executing condition and the failure diagnosis prohibiting condition are fulfilled alternately, the frequency of the execution and stop of EGR for failure diagnosis can be lessened, by which the deterioration in riding quality and drivability of the vehicle is prevented.

Preferably, the failure diagnosis in the above-described failure determining method includes the steps of (d) detecting at least one of the state quantity on the intake system side of the EGR valve in the EGR passage and the state quantity in the intake system, (e) comparing the state quantity detected in step (d) when the EGR valve is opened with the state quantity detected in step (d) when the EGR valve is closed, and (f) executing the failure diagnosis in accordance with the result of comparison made in step (e). In this case, it can be determined whether a significant change in state quantity has occurred before and after the execution of EGR. Therefore, the failure diagnosis of the EGR apparatus can be executed reliably.

Preferably, step (d) includes detecting the intake pressure and the intake air temperature of the intake system. In this case, the failure diagnosis of the EGR apparatus can be executed at a relatively low cost and reliably.

Preferably, step (a) includes detecting the rotational speed or the temperature of the internal combustion engine, determining whether the vehicle is stopping, and determining whether the internal combustion engine is in a decelerated operation state. Also, step (b) includes judging that the failure diagnosis prohibiting condition is fulfilled when the rotational speed of the internal combustion engine is not within a predetermined range, or when the temperature of the internal combustion engine is lower than a predetermined temperature, or when it is judged that the vehicle is stopping. In this case as well, the failure diagnosis of the EGR apparatus can be executed at a relatively low cost and reliably.

These and other objects and advantages will become more readily apparent from an understanding of the preferred embodiments described below with reference to the following drawing figures.

BRIEF DESCRIPTION OF THE DRAWINGS

The invention will become more fully understood from the detailed description herein below with reference to the accompanying figures, given by way of illustration only and not intended to limit the present invention in which.

DETAILED DESCRIPTION

In the following, a failure determining apparatus in accordance with one embodiment of the present invention, which is mounted on an exhaust gas recirculation apparatus, will be described in detail.

Figure 1:
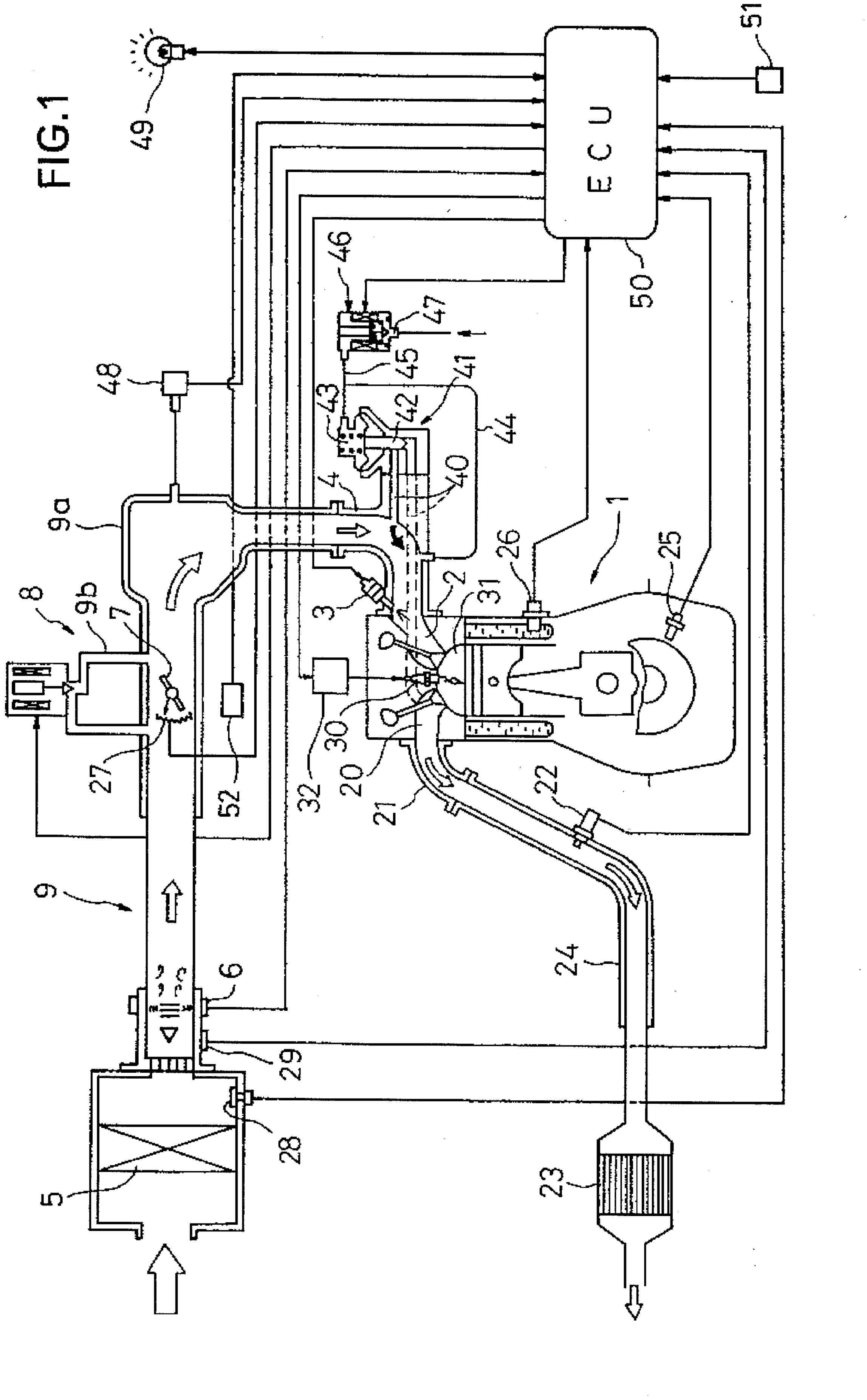
FIG. 1 is a schematic view showing a failure determining apparatus in accordance with one embodiment of the present invention, together with peripheral elements.

In FIG. 1, reference numeral 1 denotes an automotive engine, for example, a four-cylinder in-line gasoline engine. An intake manifold 4, connected to an intake port 2 of the engine 1, is provided with a fuel injection valve 3 for each cylinder. An intake pipe 9, connected to the intake manifold 4 via a surge tank 9*a* for preventing intake pulsation, is provided with an air cleaner 5 and a throttle valve 7. A bypass passage 9*a* for bypassing the throttle valve 7 is provided with an idling speed control (ISC) valve 8. When idling the engine 1, the opening degree of the ISC valve is controlled in accordance with engine load, whereby an amount of secondary air supplied to the engine 1 via the bypass passage 9*b* and hence the idling speed of the engine 1 are adjusted in accordance with engine load.

An exhaust manifold 21 is connected to an exhaust port 20 of the engine 1, and a muffler, not shown, is connected to the exhaust manifold 21 via an exhaust pipe 24 and a three-way catalyst 23. Reference numerals 30 and 32 denote an ignition plug for igniting a gas mixture of air and fuel supplied from the intake port 2 to a combustion chamber 31, and an ignition unit connected to the ignition plug 30, respectively.

The EGR apparatus mounted on the engine 1 functions so as to recirculate (flow back) part of the exhaust gas discharged from the engine 1 to the engine 1 via the exhaust manifold 21 and the intake manifold 4. The EGR apparatus is equipped with an EGR passage 40 extending between the exhaust manifold 21 and the intake manifold 4, a negative-pressure operated EGR valve 41 for adjusting the amount of the exhaust gas recirculated from the exhaust manifold 21 to the intake manifold 4 via the EGR passage 40, and an EGR control means for controlling the drive of the EGR valve 41 in accordance with the operation state of the engine 1. The EGR control means includes a control valve 46 and an electronic control unit (ECU) 50.

The EGR valve 41 has a negative pressure chamber 43 and a valve chest, which are defined by a casing and a diaphragm of the valve and which are provided on either side of the diaphragm. Disposed in the valve chest is a valve body 42 connected to the diaphragm for opening and closing the EGR passage 40, and in the negative pressure chamber 43 is disposed a spring which energizes the valve body 42 in the valve closing direction. The negative pressure chamber 43 is connected to the intake manifold 4 via a pipe 44. A pipe 45 branched from the pipe 44 is connected to the control valve 46.

The control valve 46 comprises a normally-open electromagnetic valve which includes an atmospheric port 47 opening to the atmosphere, a valve body for opening and closing the atmospheric port 47, a spring energizing the valve body in the valve opening direction, and a solenoid electrically connected to the ECU 50. The electromagnetic control valve 46, which is subjected to ON/OFF duty control by the ECU 50, is designed so that it opens when the solenoid is de-energized (turned OFF) while it closes when the solenoid is energized (turned ON).

When the electromagnetic control valve 46 opens, the atmospheric air flows into the negative pressure chamber 43 via the atmospheric port 7, so that the EGR valve 41 closes, causing the EGR passage 40 to close. On the other hand, when the electromagnetic control valve 46 closes, intake negative pressure is introduced from the intake manifold 4 to the negative pressure chamber 43 via the pipe 44, so that the EGR valve 41 opens, causing the EGR passage 40 to open. As a result, part of the exhaust gas flowing through the exhaust manifold 21 is circulated back to the intake manifold 4 via the EGR passage 40. The recirculated exhaust gas flows into a combustion chamber 31 via the intake port 2, by which the combustion temperature decreases so that the generation of nitrogen oxides is restrained.

In FIG. 1, reference numeral 6 denotes a Karman vortices air flow sensor, mounted on the intake pipe 9, for detecting the amount of intake air; 22 denotes an $O_2$ sensor (air-fuel ratio detecting means) for detecting the oxygen concentration in the exhaust gas flowing in the exhaust pipe 24; 25 denotes a crank angle sensor including an encoder interlocked with a camshaft of the engine 1 and generating a crank angle synchronization signal; 26 denotes a water temperature sensor for sensing the engine coolant temperature $T_W$; and 27 denotes a throttle sensor for detecting the opening degree $\theta_{TH}$ of the throttle valve 7. Reference numeral 28 denotes an atmospheric pressure sensor for sensing the atmospheric pressure $P_a$; 29 denotes an intake air temperature sensor for sensing the intake air temperature $T_a$; 48 denotes a pressure sensor for detecting an intake pressure P (intake state quantity) in the surge tank of the intake pipe 9; and 51 denotes a wheel speed sensor, disposed to face a vehicle wheel, for detecting the rotational speed of the vehicle wheel.

The vehicle is also provided with various switches (not shown) including an idle switch which is turned on when the throttle valve 7 is at the idle position (almost fully closed state) and auxiliary equipment switches for detecting the operation states of auxiliary equipment such as an air conditioner and a power steering unit.

The electronic control unit (ECU) 50 has an input/output unit, storage devices (ROM, RAM, nonvolatile RAM, etc.) incorporating various control programs, a central processing unit (CPU), timer, etc. (any of which are not shown). To the input side of the ECU 50, various sensors including the aforementioned sensors 6, 22, 25 to 29, 48 and 51, and various switches including the aforementioned idle switch 52 and the auxiliary equipment switches are connected electrically. To the output side of the ECU 50, the solenoid of the ISC valve 8, the solenoid of the electromagnetic control valve 46, and a warning light 49, mounted on the instrument panel of vehicle, for warning the driver of the failure of the EGR apparatus are connected electrically.

The ECU 50 calculates the engine speed $N_E$ from the generation time interval of the crank angle synchronization signal sent from the crank angle sensor 25, calculates the amount of intake air per one suction stroke (A/N) from the engine speed and the output of the air flow sensor 6, and determines whether the vehicle is running or stopping on the basis of the output of the wheel speed sensor 51. The ECU also determines the operation state of the engine 1 in accordance with the calculated engine speed $N_E$, the calculated intake air amount (A/N), the oxygen concentration in the exhaust gas which is detected by the $O_2$ sensor, and the operation states of the auxiliary equipment which are detected by the auxiliary equipment switches.

The ECU 50 controls the amount of fuel injected from the respective fuel injection valve 3 to the engine 1 in accordance with the engine operation state thus determined. It also controls the ignition timing of the ignition plug 30 by controlling the drive of the ignition unit 32. The ECU 50, as an idling speed control means, controls the ISC valve opening degree by controlling the drive of the solenoid of the ISC valve 8 in accordance with the engine operation state. Further, the ECU 50, serving as an EGR control means, variably adjusts the opening degree of the EGR valve 43 by subjecting the electromagnetic control valve 46 to ON/OFF duty control, thereby variably adjusting the amount of the exhaust gas circulated from the exhaust manifold 20 to the intake manifold 4 via the EGR passage 40.

The ECU 50 has a failure determining function of the EGR apparatus (EGR passage 40 and/or EGR valve 41) in addition to the control function relating to the aforementioned fuel supply, ignition timing, idling speed, and EGR. Specifically, the ECU 50, serving as a failure diagnosis means, changes the EGR amount by temporarily opening and closing the EGR valve 41 when determining a failure, and monitors the change in pressure in the surge tank (or intake air temperature change) caused by the change in the EGR amount. To this end, when the failure diagnosis executing condition, described later, is fulfilled, the ECU 50 reads the output of the pressure sensor 48 indicative of the pressure level in the surge tank when the EGR valve 41 is closed and when the valve is open, while causing the EGR valve 41 to be opened and closed, and compares the two pressure levels in the surge tank to determine the presence/absence of a failure in the EGR apparatus.

Specifically, when the EGR apparatus is working properly, the EGR amount changes as the EGR valve 41 is opened and closed, and the pressure in the surge tank changes as the EGR amount changes. Hence, when the change in the pressure in the surge tank is smaller than that obtained when the EGR apparatus is working properly, the control unit judges that the EGR apparatus has failed. Incidentally, to minimize the fluctuation in the torque of the engine 1, the failure diagnosis executing condition includes a condition that the engine 1 is running in a decelerated operation zone.

Further, the ECU 50 constitutes an operation state detecting means for detecting the operation state of the vehicle and/or engine 1 in cooperation with the related ones of the aforementioned various sensors and switches (for example, the sensors 25 to 27 and 51 and the switch 52). The ECU 50 also functions as a failure diagnosis prohibiting means for determining whether the failure diagnosis executing condition (failure diagnosis prohibiting condition) has been fulfilled, on the basis of the detected operation state, and for prohibiting the execution of failure diagnosis during the time when the failure diagnosis prohibiting condition is fulfilled.

According to this failure diagnosis prohibiting function, when the failure diagnosis executing condition is fulfilled for the first time, or when the failure diagnosis executing condition which has become unfulfilled once is fulfilled again, the ECU 50 does not immediately start or restart failure diagnosis, and prohibits the start or restart of failure diagnosis until a predetermined period of time has elapsed after the fulfillment of the failure diagnosis executing condition. Whereby, the fluctuation in engine speed and engine output torque, which would otherwise occur when the execution and stop of EGR for failure diagnosis are repeated frequently, is prevented, thereby preventing the deterioration in the riding quality and drivability of the vehicle.

In the following, the operation of the failure diagnosis apparatus shown in FIG. 1 will be described.

Figure 2:
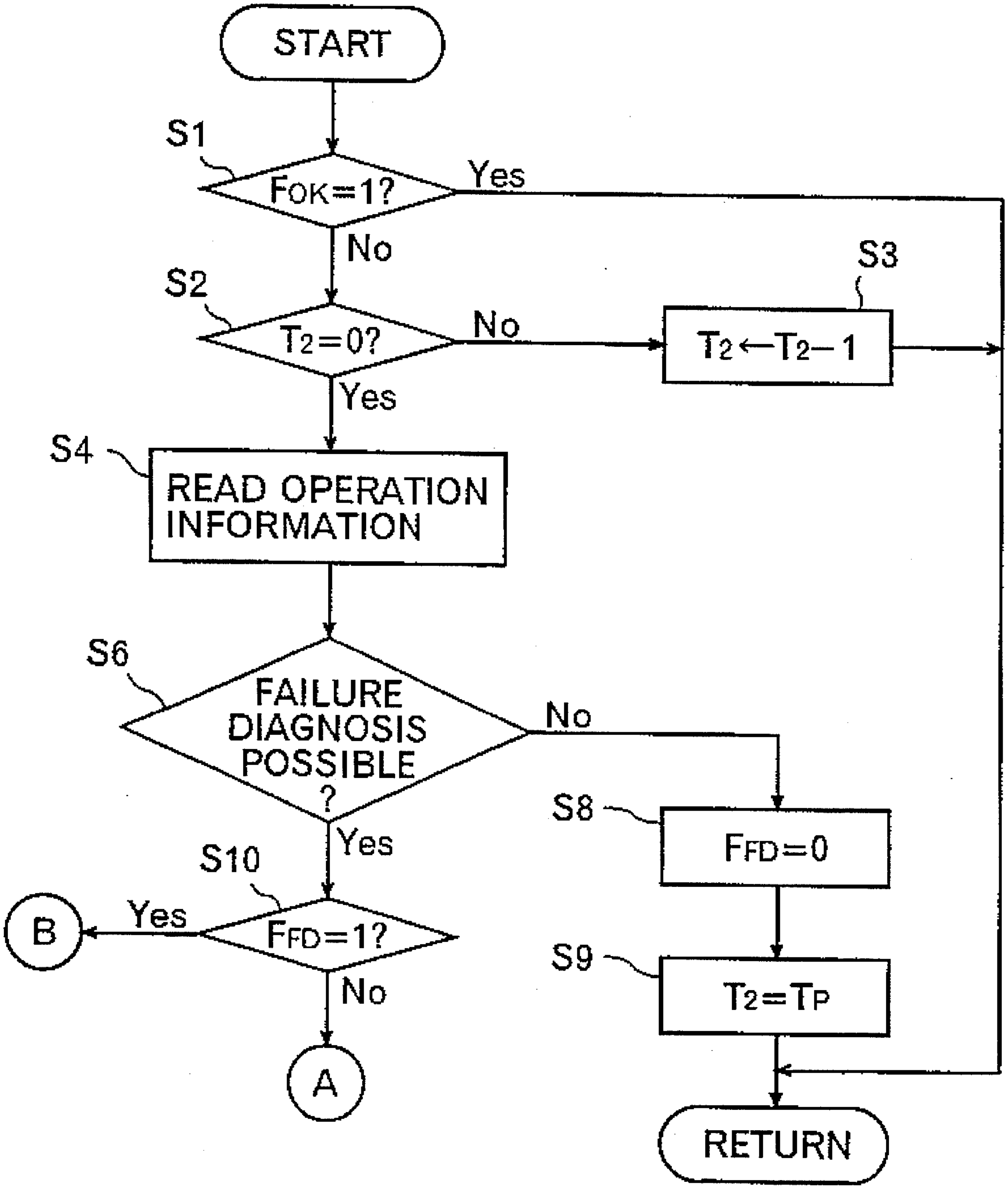
FIG. 2 is a flowchart showing a part of a failure diagnosis subroutine executed by an electronic control unit (ECU) shown in FIG. 1.
Figure 3:
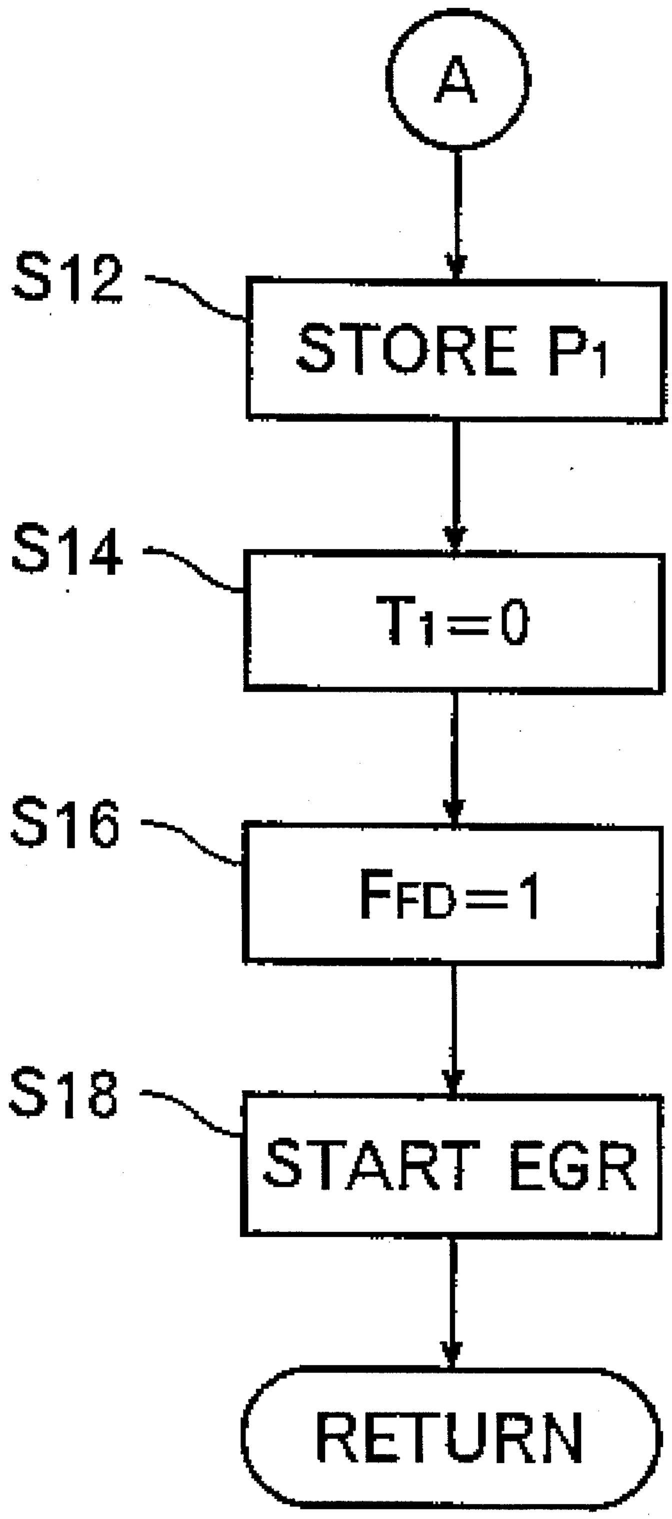
FIG. 3 is a flowchart showing another part of failure diagnosis subroutine, following FIG. 2.
Figure 4:
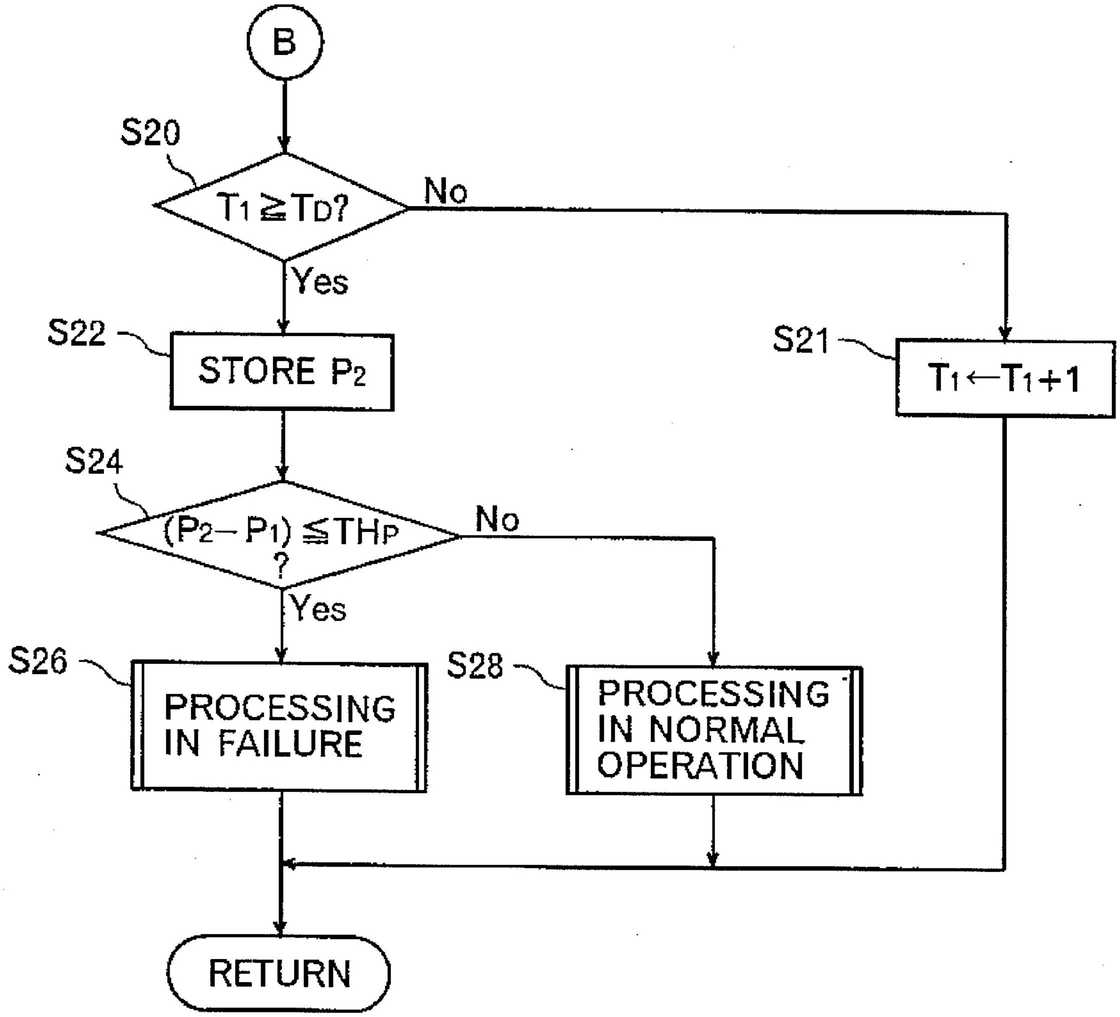
FIG. 4 is a flowchart showing still another part of failure diagnosis subroutine, following FIG. 2.

When an ignition key is turned on by the driver and the engine 1 is started, the ECU 50 starts the execution of the failure diagnosis subroutine shown in FIGS. 2 to 4.

In the failure diagnosis subroutine, it is first determined whether the value of the flag $F_{OK}$ is "1" which indicates the normal operation of the EGR apparatus (Step S1). Immediately after this subroutine is started, the failure diagnosis of the EGR apparatus is not yet executed, and it is unknown whether the EGR apparatus operates normally. Immediately after the subroutine is started, the value of the flag $F_{OK}$ is set at the initial value of "0". Therefore, the judgment result in Step S1 in the first subroutine execution cycle (control cycle) is No, and the control flow proceeds to Step S2.

In Step S2, a determination is made as to whether the count value $T_2$ of a count-down timer incorporated in the ECU 50 is "0". As described later, this count value $T_2$ is set at a value of $T_p$ corresponding to the waiting time when the failure diagnosis executing condition (described later) is not fulfilled. On the other hand, immediately after the subroutine is started, it is not yet determined whether the failure diagnosis executing condition is fulfilled. Therefore, the count value $T_2$ immediately after the subroutine is started is set at the initial value of "0", so that the judgment result in Step S2 is No. The control flow proceeds to Step S4.

In Step S4, the outputs of the crank angle sensor 25, the water temperature sensor 26, the throttle sensor 27, and the wheel speed sensor 51 and the output (ON/OFF position) of the idle switch 52 are read by the ECU 50 as operation information, and stored in the RAM of the ECU 50.

In Step S6, it is determined whether the current operation state fulfills the failure diagnosis executing condition. The failure diagnosis executing condition includes a first condition that the engine coolant temperature $T_W$ indicative of the engine temperature is not lower than a predetermined value (for example, 82° C.), a second condition that the vehicle is running, a third condition that the engine speed $N_E$ is in a predetermined range (for example, 1000 rpm$<N_E<$1690 rpm), and a fourth condition that the throttle valve 7 is almost fully closed (that is, the engine is running in a decelerated operation state). Only when all of the first to fourth conditions are met at the same time, the failure diagnosis executing condition is fulfilled.

Immediately after the engine is started, usually, the vehicle is in a stopped state, or the engine 1 is cold, or the accelerator pedal is depressed so that the throttle valve 7 is not fully closed. Therefore, the judgment result in Step S6 in the first control cycle is No. In this case, it is judged that the failure diagnosis executing condition is not fulfilled, so that the control flow proceeds to Step S8. In Step S8, the value of the flag $F_{FD}$ is set at "0" which indicates that the failure diagnosis is not being executed (more specifically, the measurement of the intake pressure P just before the start of EGR for failure diagnosis is not yet made).

In Step S9, the count value $T_2$ of the count-down timer is set at a value $T_p$ which is equal to a value obtained by dividing a predetermined waiting time (for example, 20 seconds) by the subroutine execution period (Step S9). Thus, the execution of the subroutine of the present (here, first) control cycle is completed.

Thereafter, when a period of time corresponding to the subroutine execution cycle (a predetermined cycle) has elapsed, the failure diagnosis subroutine shown in FIGS. 2 to 4 is executed again from Step S1. In other words, the failure diagnosis subroutine is executed repeatedly at predetermined cycles by the ECU 50.

In the second and the following control cycles, the judgment results in Steps S1 and S2 are No, so that the control flow proceeds to Step S3, where a value "1" corresponding to the subroutine execution cycle is subtracted from the count value $T_2$ of the count-down timer. Then, the control flow returns to Step S1. In other words, in the second and the following control cycles, a series of Steps S1, S2, and S3 are executed repeatedly at predetermined cycles.

During this time, a conventionally known EGR control subroutine, not described here, is executed in parallel with the failure diagnosis subroutine shown in FIGS. 2 to 4 by the ECU 50. Thereupon, the drive of the electromagnetic control valve 46 is controlled by the ECU 50, and the ordinary EGR, not the EGR for failure diagnosis, is executed as necessary.

As described above, as the result of repeated execution of Steps S1, S2, and S3 of the failure diagnosis subroutine, when the judgment result in Step S2 in the subsequent control cycle is Yes, that is, it is judged that the count value $T_2$ is equal to "0" (the waiting time $T_p$ has elapsed), the control flow proceeds to Step S6 through Step S4. In Step 6, it is again determined whether the current operation state represented by the operation information detected in Step S4 fulfills the failure diagnosis executing condition.

If the judgment result in Step S6 is No, like the first control cycle, the value of the flag $F_{FD}$ is set at "0" which indicates that the failure diagnosis is not being executed, in Step 8, and the count value $T_2$ of the count-down timer is set at a value $T_p$ corresponding to the waiting time, in Step S9. After that, a series of Steps S1, S2, and S3 are executed repeatedly at intervals of the predetermined cycle.

On the other hand, if it is judged in Step S6 that the current operation state fulfills the failure diagnosis executing condition, the control flow proceeds to Step 10, where it is determined whether the value of the flag $F_{FD}$ is "1" which indicates that the failure diagnosis is being executed. Immediately after the failure diagnosis executing condition is fulfilled, the value of the flag $F_{FD}$ is still set at the initial value of "0". Therefore, the judgment result in Step S10 is No. In this case, the control flow proceeds to Step S12 in FIG. 3. In Step S12, the output of the pressure sensor 48, indicative of the intake pressure P, is read by the ECU 50, and stored in the RAM of the ECU 50 as the intake pressure P just before the start of EGR for failure diagnosis (a first intake pressure $P_1$).

In Step S14, the count value $T_1$ of a count-up timer is set at the initial value of "0", and in the next step S16, the value of the flag $F_{FD}$ is set at "1" which indicates that the failure diagnosis is being executed. Further, in Step 18, the electromagnetic control valve 46 is energized by the ECU 50 to open. As a result, intake negative pressure is introduced from the intake manifold 4 to the negative pressure chamber 43 of the EGR valve 41 via the pipe 44 to open the EGR valve 41, by which the EGR passage 40 is opened, so that part of the exhaust gas flowing through the exhaust manifold 21 begins to recirculate to the intake manifold 4 via the EGR passage 40. That is to say, EGR for failure diagnosis is started. The control flow returns to Step S1.

In the next cycle, since the judgment result in Step S1 is No, and the judgment result in Step S2 is Yes, the control flow proceeds to Step S6 through Step S4. In Step S6, it is again determined whether the current operation state fulfills the failure diagnosis executing condition. If the judgment result in Step S6 is Yes, since the value of the flag $F_{FD}$ has been set at "1" in Step S16 in the previous cycle, the control flow proceeds to Step S20 in FIG. 4.

In Step S20, it is determined whether the count value $T_1$ of the count-up timer has reached a predetermined value $T_D$ which is equal to a value obtained by dividing a predetermined delay time period by the subroutine execution cycle. The predetermined value $T_D$ corresponds to a period of time normally required from the time when the EGR for failure diagnosis is started to the time when the change in operation state of the engine 1 caused by the execution of EGR is substantially settled. If the judgment result in Step S20 is No, "1" is added to the count value $T_1$ (Step S21), and the control flow returns to Step S1.

Afterward, as long as the operation state in which the failure diagnosis executing condition is fulfilled continues, a series of Steps S1, S2, S4, S6, S10, S20, and S21 are executed repeatedly, by which the count value $T_1$ of the count-up timer is increased in increments. If it is judged in Step S20 that the count value $T_1$ of the count-up timer has reached the predetermined value $T_D$, the control flow proceeds to Step S22.

In Step S22, the output of the pressure sensor 48, indicative of the intake pressure P, is read by the ECU 50, and stored in the RAM of the ECU 50 as the intake pressure P when the delay time has elapsed from the time when the EGR for failure diagnosis is started (a second intake pressure $P_2$). In Step S24, the first intake pressure $P_1$ obtained just before the start of EGR and the second intake pressure $P_2$ obtained when the delay time has elapsed from the EGR start time are read from the RAM. The difference ($P_2-P_1$) between the first intake pressure $P_1$ and the second intake pressure $P_2$ is calculated by subtracting the first intake pressure $P_1$ from the second intake pressure $P_2$. Further, it is determined whether the difference ($P_2-P_1$) is smaller than a predetermined threshold $TH_p$ (for example, 10 mmHg).

If the judgment result in Step S24 is Yes, that is, if a significant increase in intake pressure is not detected though the EGR for failure diagnosis is executed, it is judged that the EGR apparatus is faulty, so that the control flow proceeds to Step S26, the subroutine for the processing in failure being executed.

Figure 5:
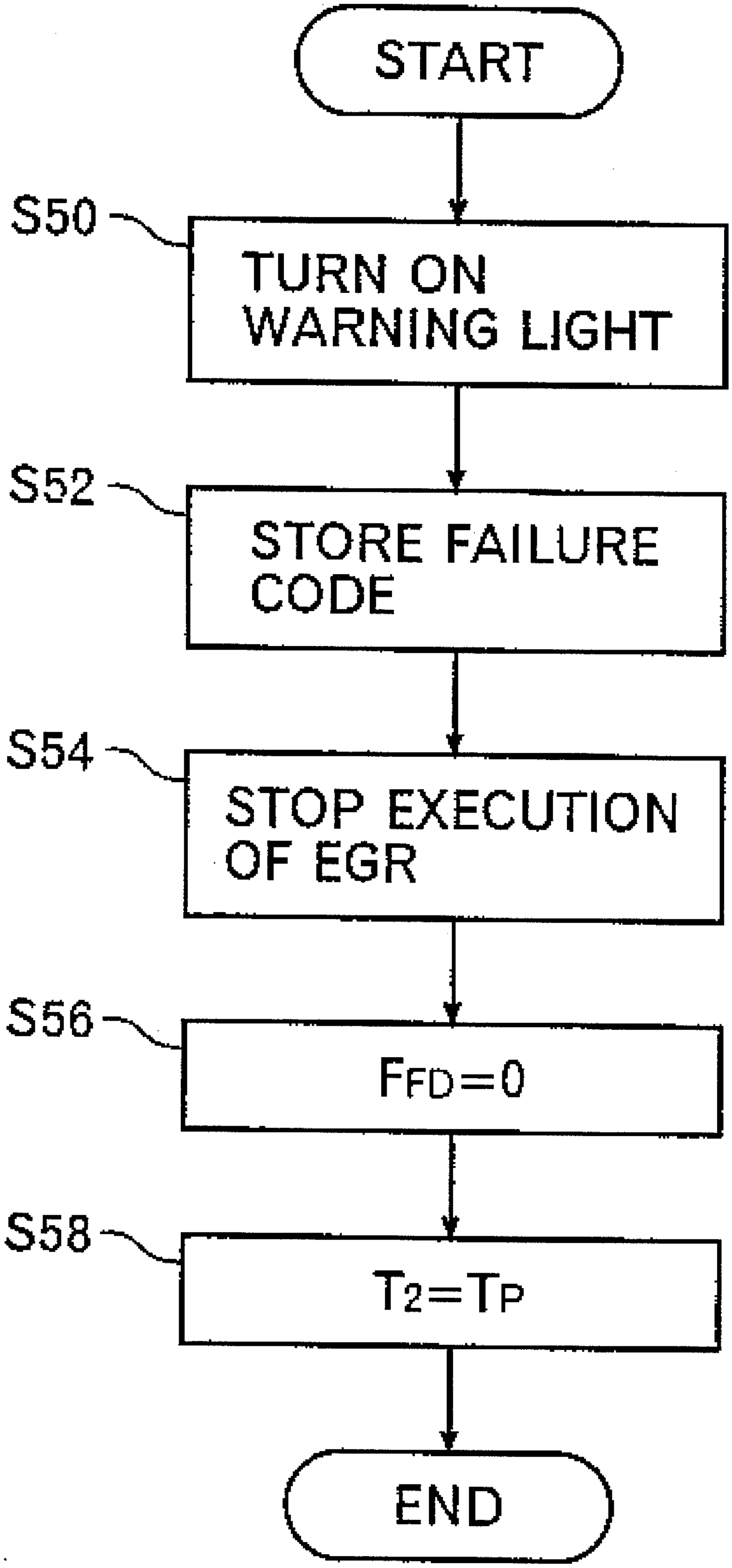
FIG. 5 is a flowchart of the subroutine for the processing in failure shown in FIG. 4.

As shown in detail in FIG. 5, in this subroutine for the processing in failure, first of all, in Step S50, the warning light 47 is lit under the control of the ECU 50 to warn the driver of the occurrence of failure. In Step S52, a failure code representing the failure of the EGR apparatus is written in the RAM of the ECU 50 by means of the ECU 50. In Step S54, the electromagnetic control valve 46 is de-energized under the control of the ECU 50, so that the atmospheric air flows into the negative pressure chamber 43 of the EGR valve 41 via the atmospheric port 47 of the electromagnetic control valve 46, by which the EGR valve 41 is closed, so that the EGR passage 40 is closed. As a result, the EGR for failure diagnosis is stopped.

In Step S56, the value of the flag $F_{FD}$ is reset to "0" which indicates that the failure diagnosis is not being executed. In Step S58, the value $T_2$ is set at the value $T_p$ corresponding to the waiting time, by which the subroutine for the processing in failure in FIG. 5 is completed, and the control flow returns to the failure diagnosis subroutine in FIGS. 2 to 4.

In the failure diagnosis subroutine executed after the completion of the subroutine for the processing in failure, the judgment results of Steps S1 and S2 are No. Therefore, a series of Steps S1, S2, and S3 are executed repeatedly while the count value $T_2$ of the count-down timer is decreased in decrements from the value $T_p$ corresponding to the waiting time. Thereupon, the execution of failure diagnosis is prohibited from the time when it is judged that the EGR apparatus is faulty until the waiting time has elapsed. This is because if the EGR for failure diagnosis is allowed when the EGR apparatus is faulty, the execution and interruption of EGR is repeated, so that the fluctuation in torque of the engine 1 may occur frequently.

If the malfunction occurring on the EGR apparatus is temporary, the EGR apparatus sometimes becomes normal again after it is judged that the EGR apparatus is faulty. That is to say, there is a possibility that the judgment of faulty EGR apparatus is mistaken in the aforementioned step S24.

Even if it is once judged in Step S24 that the EGR apparatus is faulty, when the waiting time has elapsed from the time when such judgment is made, re-execution of failure diagnosis is possible. If it is judged in Step S2 that the count value $T_2$ is equal to "0" after the waiting time has elapsed from the time when it is judged in Step S24 that the EGR apparatus is faulty, the processing after Step S4, inclusive, is carried out.

In the failure diagnosis subroutine in FIGS. 2 to 4, if it is judged at Step S24 in FIG. 4, executed for the first time, that the difference $(P_2-P_1)$ between the first intake pressure $P_1$ obtained just before the start of EGR and the second intake pressure $P_2$ obtained when the delay time has elapsed from the EGR start time is larger than the threshold $TH_p$, that is, if the judgment result in Step S24 is No, the control flow proceeds to Step 28, the subroutine for the processing in normal operation being executed. Even though the judgment result in Step S24 executed for the first time is Yes, that is, even though it is once judged in Step S24 that the EGR apparatus is faulty, if the judgment result in Step S24 re-executed afterward is No, then the subroutine for the processing in normal operation is executed.

Figure 6:
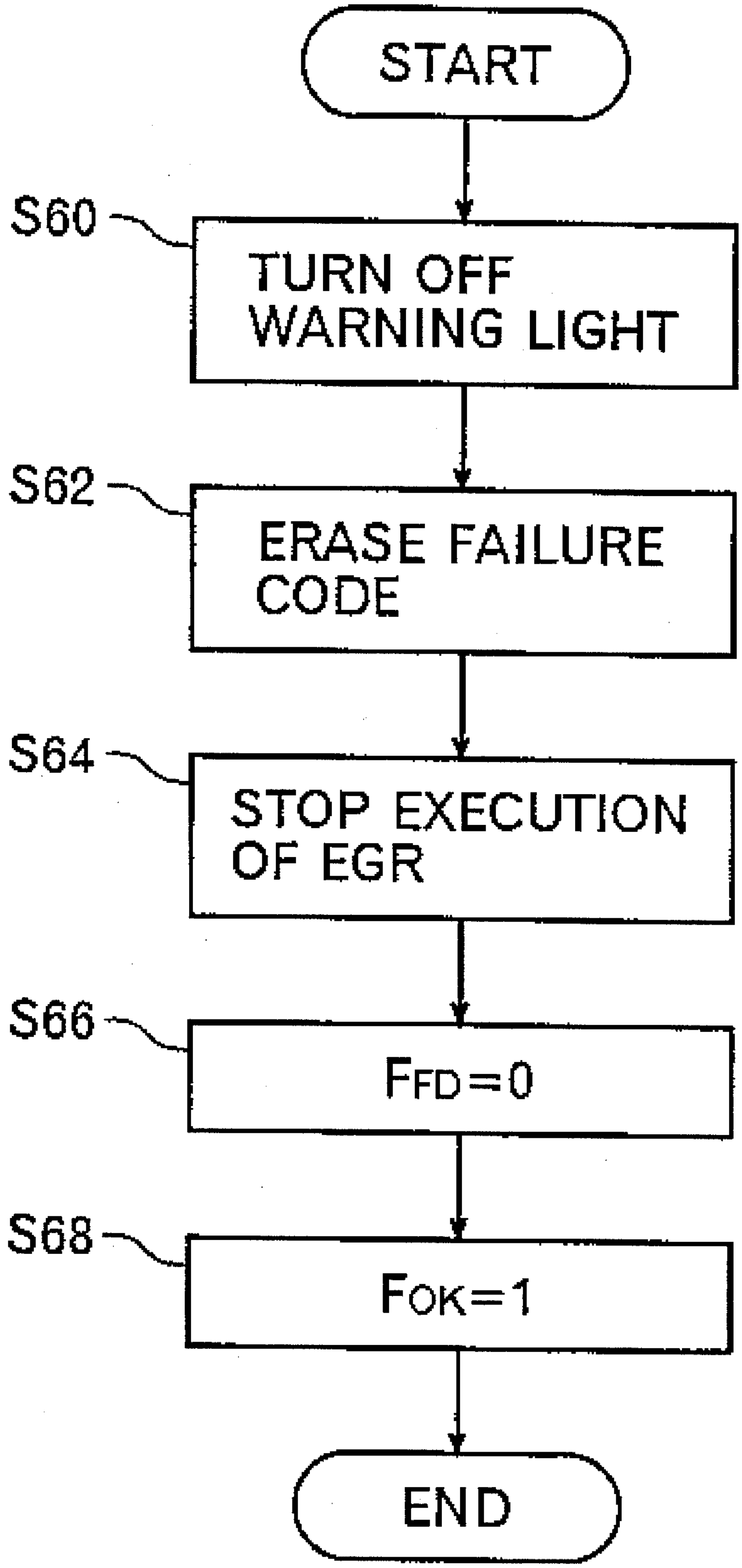
FIG. 6 is a flowchart of the subroutine for the processing in normal operation shown in FIG. 4.

As shown in FIG. 6 in detail, in this subroutine for the processing in normal operation, first of all, in Step S60, the warning light 47 is extinguished under the control of the ECU 50. Next, in Step S62, the failure code representing the failure of the EGR apparatus, which has been written in the RAM of the ECU 50, is erased by the ECU 50. In Step S64, the electromagnetic control valve 46 is de-energized under the control of the ECU 50, so that the atmospheric air flows into the negative pressure chamber 43 of the EGR valve 41 via the atmospheric port 47 of the electromagnetic control valve 46, by which the EGR valve 41 is closed, and the EGR passage 40 is closed. As a result, the EGR for failure diagnosis is stopped.

In Step S66, the value of the flag $F_{FD}$ is reset to "0" which indicates that the failure diagnosis is not being executed. In Step S68, the value of the flag FOK is set at "1" which indicates that the EGR apparatus operates normally, by which the subroutine for the processing in normal operation is completed, and the control flow returns to the failure diagnosis subroutine in FIGS. 2 to 4.

In the failure diagnosis subroutine executed after the completion of the subroutine for the processing in failure, the judgment result in Step S1 is Yes, so that the control flow immediately returns to Step S1. Therefore, substantial processing is not carried out in the failure diagnosis subroutine until the ignition key is turned on after it is once turned off.

In Step S6 in the failure diagnosis subroutine, during the time when it is judged that the failure diagnosis executing condition is fulfilled and the failure diagnosis is being executed, the failure diagnosis executing condition sometimes becomes unfulfilled, that is, the judgment result in Step S6 becomes No because the vehicle is operated in an acceleration mode or for other reasons. In this case, the control flow proceeds to Step 8, where the value of the flag $F_{FD}$ is reset to "0", and in the next step S9, the value of $T_2$ of the count-down timer is set at the value $T_p$ corresponding to the waiting time. As a result, even if the failure diagnosis is being executed, the substantial failure diagnosis is interrupted from the time when the failure diagnosis executing condition becomes unfulfilled until the waiting time has elapsed. Whereby, the fluctuation in torque and the deterioration in drivability, which are caused by the frequent repetition of the execution and stop of EGR for failure diagnosis, are prevented. When the waiting time has elapsed, that is, the judgment result in Step S3 is Yes, and when the judgment result in Step S6 is also Yes, new diagnosis is started.

According to the failure diagnosis subroutine shown in FIGS. 2 to 4, even when the vehicle is running in an urban area in which the operation state of the vehicle and/or engine 1 is liable to change, and therefore the failure diagnosis is liable to be interrupted, the interval of failure diagnosis is sufficiently long, so that the deterioration in riding quality and drivability, which is caused by the frequent repetition of the execution and stop of EGR for failure diagnosis, is prevented.

The present invention is not limited to the above embodiment, and can be modified variously.

For example, in the above embodiment, the failure diagnosis of the EGR apparatus is executed on the basis of the change in intake pressure before and after the EGR execution for failure diagnosis. Alternatively, the intake air temperature near the position where the exhaust gas is introduced at the intake manifold is detected before and after the execution of EGR, the change in intake air temperature before and after the execution of EGR is determined, and if the amount of change in intake air temperature is smaller than a predetermined value, it may be judged that the EGR apparatus is faulty.

Also, the EGR is stopped temporarily during the continuation of EGR for failure diagnosis, and the failure diagnosis of the EGR apparatus may be executed on the basis of the change in the operation state of the vehicle and/or engine occurring when the EGR is stopped temporarily.

Further, the specific procedures in the failure diagnosis can be modified variously. For example, in FIG. 2, after it is determined in Step S2 whether the count value $T_2$ of the count-down timer is "0", the operation information is read in Step S4, and the fulfillment of the failure diagnosis executing condition is judged in Step S6. Alternatively, the judgment on the count value $T_2$ may be made after the judgment on the failure diagnosis executing condition.

From the above-described embodiments of the present invention, it is apparent that the present invention may be modified as would occur to one of ordinary skill in the art without departing from the spirit and scope of the present invention which should be defined solely by the appended claims. All such modifications as would be obvious to one of ordinary skill in the art should not be regarded as a departure from the spirit and scope of the invention, and should be included within the scope of the scope of the invention as defined solely by the appended claims.

What is claimed is:

1. An apparatus for determining a failure of an exhaust gas recirculation apparatus having an EGR passage extending between an exhaust system and an intake system of an internal combustion engine mounted on a vehicle, and an EGR valve, disposed in said EGR passage and arranged to be opened and closed, for controlling an amount of exhaust gas recirculating from said exhaust system to said intake system via said EGR passage, said apparatus for determining a failure being provided with failure determining means for executing failure diagnosis of at least one of said EGR valve and said EGR passage while opening/closing said EGR valve, comprising:

operation state detecting means for detecting an operation state of at least one of said vehicle and said internal combustion engine; and failure diagnosis prohibiting means for determining whether a predetermined failure diagnosis prohibiting condition is fulfilled on the basis of the operation stated detected by said operation state detecting means, and for prohibiting the execution of said failure diagnosis executed by said failure determining means for a predetermined period of time from a time when said predetermined failure diagnosis prohibiting condition is fulfilled.

2. A failure determining apparatus according to claim 1, further comprising:

intake state quantity detecting means for detecting at least one of a state quantity on an intake system side of said EGR valve in said EGR passage and a state quantity in said intake system; and comparing means for comparing the state quantity detected by said intake state quantity detecting means when said EGR valve is opened with the state quantity detected by said intake state quantity detecting means when said EGR valve is closed;

said failure determining means executing said failure diagnosis in accordance with a result of said comparison.

3. A failure determining apparatus according to claim 2, wherein said intake state quantity detecting means detects intake pressure in said intake system as said state quantity.

4. A failure determining apparatus according to claim 2, wherein said intake state quantity detecting means detects intake air temperature in said intake system as said state quantity.

5. A failure determining apparatus according to claim 1, wherein said operation state detecting means detects a temperature of said internal combustion engine, and said failure diagnosis prohibiting means judges that said predetermined failure diagnosis prohibiting condition is fulfilled when said internal combustion engine temperature detected by said operation state condition detecting means is lower than a predetermined temperature.

6. A failure determining apparatus according to claim 1, wherein said operation state detecting means determines whether said vehicle is stopping, and said failure diagnosis prohibiting means judges that said predetermined failure diagnosis prohibiting condition is fulfilled when said operation state detecting means judges that said vehicle is stopping.

7. A failure determining apparatus according to claim 1, wherein said operation state detecting means detects a rotational speed of said internal combustion engine, and said failure diagnosis prohibiting means determines whether said predetermined failure diagnosis prohibiting condition is fulfilled on the basis of the rotational speed of said internal combustion engine detected by said operation state detecting means.

8. A failure determining apparatus according to claim 7, wherein said failure diagnosis prohibiting means judges that said predetermined failure diagnosis prohibiting condition is fulfilled when the rotational speed of said internal combustion engine is not within a predetermined range.

9. A failure determining apparatus according to claim 1, wherein said operation state detecting means determines whether said internal combustion engine is in a decelerated operation state, and said failure diagnosis prohibiting means judges that said predetermined failure diagnosis prohibiting condition is fulfilled when said operation state detecting means judges that said internal combustion engine is not in a decelerated operation state.

10. A failure determining apparatus according to claim 9, wherein said operation state detecting means determines that said internal combustion engine is in said decelerated operation state when a throttle valve of said internal combustion engine is substantially at said idle position.

11. A method for determining a failure of an exhaust gas recirculation apparatus having an EGR passage extending between an exhaust system and an intake system of an internal combustion engine mounted on a vehicle, and an EGR valve, disposed in said EGR passage and arranged to be opened and closed, for controlling the amount of exhaust gas recirculating from said exhaust system to said intake system via said EGR passage, in which method failure diagnosis of at least one of said EGR valve and said EGR passage is executed while opening/closing said EGR valve, comprising the steps of:

(a) detecting an operation state of at least one of said vehicle and said internal combustion engine;

(b) determining whether a predetermined failure diagnosis prohibiting condition is fulfilled on the basis of said operation state detected in said step (a);

(c) prohibiting the execution of said failure diagnosis for a predetermined period of time from a time when it is judged in said step (b) that said predetermined failure diagnosis prohibiting condition is fulfilled.

12. A failure determining method according to claim 11, further comprising of the steps of:

(d) detecting at least one of a state quantity on an intake system side of said EGR valve in said EGR passage and a state quantity in said intake system;

(e) comparing the state quantity detected in said step (d) when said EGR valve is opened with the state quantity detected in said step (d) when said EGR valve is closed; and (f) executing said failure diagnosis in accordance with a result of comparison made in said step (e).

13. A failure determining method according to claim 12, wherein said step (d) includes detecting intake pressure in said intake system as said state quantity.

14. A failure determining method according to claim 12, wherein said step (d) includes detecting an intake air temperature in said intake system as said state quantity.

15. A failure determining method according to claim 11, wherein said step (a) includes detecting a temperature of said internal combustion engine, and said step (b) includes judging that said predetermined failure diagnosis prohibiting condition is fulfilled when said internal combustion engine temperature detected in said step (a) is lower than a predetermined temperature.

16. A failure determining method according to claim 11, wherein said step (a) includes determining whether said vehicle is stopping, and said step (b) includes judging that said predetermined failure diagnosis prohibiting condition is fulfilled when said operation state detecting means judges that said vehicle is stopping.

17. A failure determining method according to claim 11, wherein said step (a) includes detecting a rotational speed of said internal combustion engine.

18. A failure determining method according to claim 17, wherein said step (b) includes judging that said predetermined failure diagnosis prohibiting condition is fulfilled when the rotational speed of said internal combustion engine is not within a predetermined range.

19. A failure determining method according to claim 11, wherein said step (a) includes determining whether said internal combustion engine is in a decelerated operation state, and said step (b) includes judging that said predetermined failure diagnosis prohibiting condition is fulfilled when it is judged in said step (a) that said internal combustion engine is not in a decelerated operation state.

20. A failure determining method according to claim 19, wherein said step (a) includes determining that said internal combustion engine is in said decelerated operation state when a throttle valve of said internal combustion engine is substantially at said idle position.

* * * * *